July 24, 1962　　　　S. J. VELINSKY　　　　3,045,310
FABRIC FASTENER

Filed July 27, 1960　　　　　　　　　　2 Sheets-Sheet 1

Stanislav J. Velinsky
INVENTOR.

BY *[signatures]*
Attorneys

July 24, 1962 S. J. VELINSKY 3,045,310
FABRIC FASTENER
Filed July 27, 1960 2 Sheets-Sheet 2
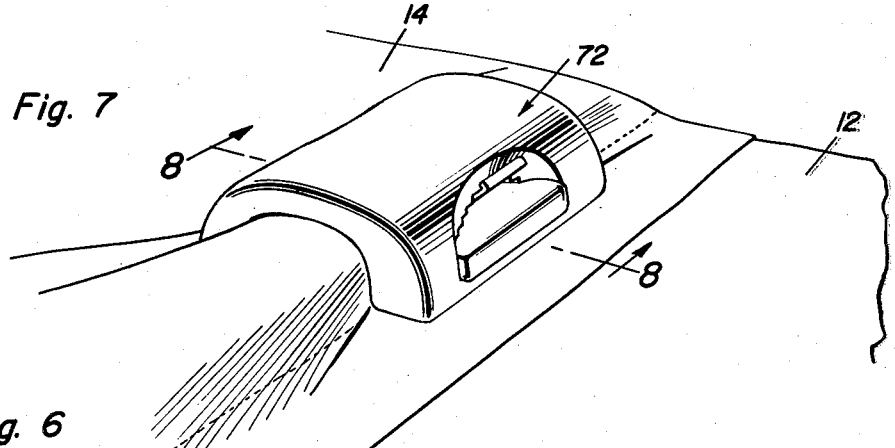
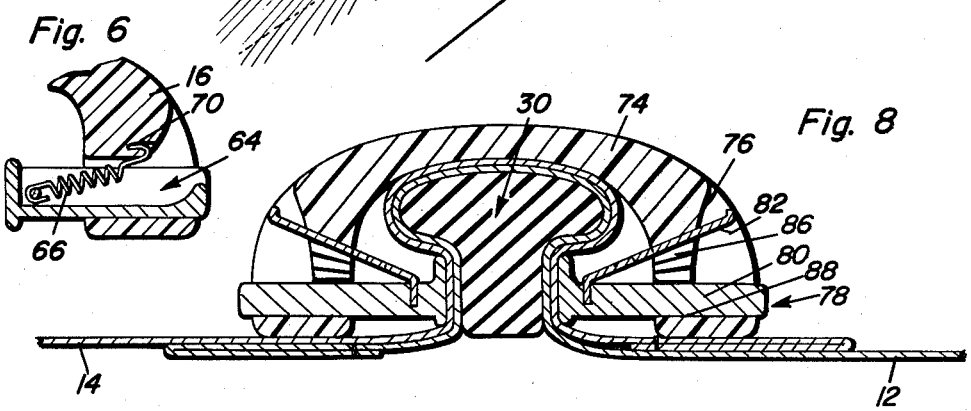
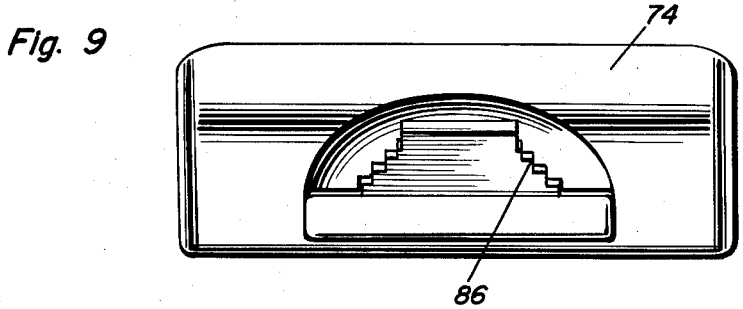
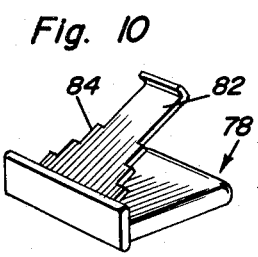
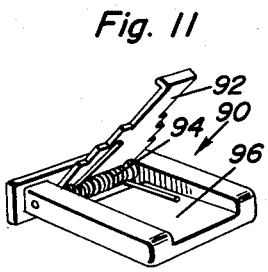
Stanislav J. Velinsky
INVENTOR.

United States Patent Office 3,045,310
Patented July 24, 1962

3,045,310
FABRIC FASTENER
Stanislav J. Velinsky, Shorter Apts., Rome, Ga.
Filed July 27, 1960, Ser. No. 45,684
5 Claims. (Cl. 24—263)

This invention relates to a fastener for holding layers of fabric together by a clamping action without damage to the fabric and without any projecting portions on one side of the fabric making the fastener especially useful as a connector for bed sheets, garments, etc.

While many fastener devices have been proposed in the past for connecting together overlapped edge portions of fabric in garments or for bed sheets, there have been serious drawbacks in the use of such fastener devices. For example, the fastener devices would have projecting portions on the underside of the fabric so that the fabric when placed in contact with the skin of a person would be annoying and uncomfortable by virtue of the projecting portions of the fasteners. Other types of fastener devices heretofore used involved the piercing of the fabric thereby causing serious damage to the fabric especially when separating forces are applied to the overlapped portions of the fabric layers held together by the fastener device. Other fastener devices not employing fabric piercing means have not been able to resist any substantial separating force. A still further problem in fastener devices heretofore used has been the difficulty in preventing shifting or displacement of the overlapped portions of the fabric accurately positioned prior to the application of the fastener device. The fastener device made in accordance with this invention therefore overcomes all of the aforementioned drawbacks, problems and disadvantages of prior fastener devices and is therefore especially useful for replacing buttons on garments or connecting bed sheets together without damage to the fabric or discomfort to the person.

Another object of this invention is to provide a fastener device which presents a pleasing appearance and yet is easily released and adjustable for use with fabrics of different thicknesses.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 6 is a fragmentary sectional view of the modification illustrated by FIGURE 5.

FIGURE 7 is a perspective view of another form of fastener device made in accordance with this invention.

FIGURE 8 is a sectional view taken through a plane indicated by section line 8—8 in FIGURE 7.

FIGURE 9 is a side elevational view of the fastener device illustrated in FIGURES 7 and 8.

FIGURE 10 is a perspective view of the clamp device used with the fastener device illustrated in FIGURES 7–9.

FIGURE 11 is a perspective view of a modification of the clamping device illustrated in FIGURE 10.

Figure 1:
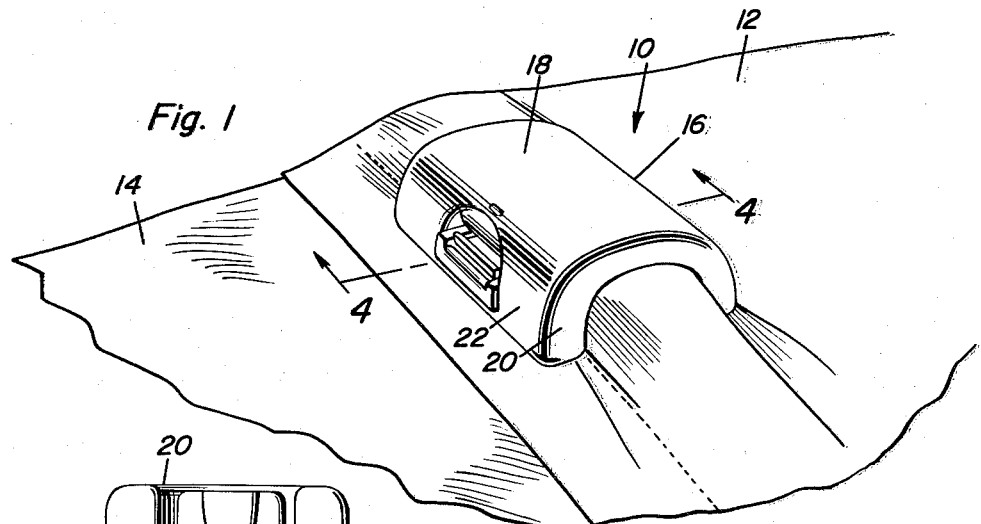
FIGURE 1 is a fragmentary perspective view of two overlapping layers of fabric fastened together by one form of a fastener device made in accordance with this invention.

Referring to the drawings in detail, FIGURE 1 illustrates one form of fastener device generally indicated by reference numeral 10 which is applied to two overlapping layers of fabric 12 and 14 for holding them together as illustrated.

Figure 2:
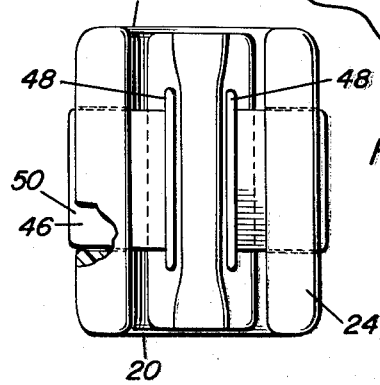
FIGURE 2 is a bottom plan view with parts shown in section of the fastener device illustrated in FIGURE 1.
Figure 3:
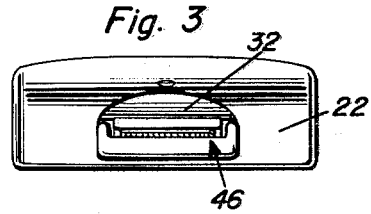
FIGURE 3 is a side elevational view of the fastener device illustrated in FIGURE 1.
Figure 4:
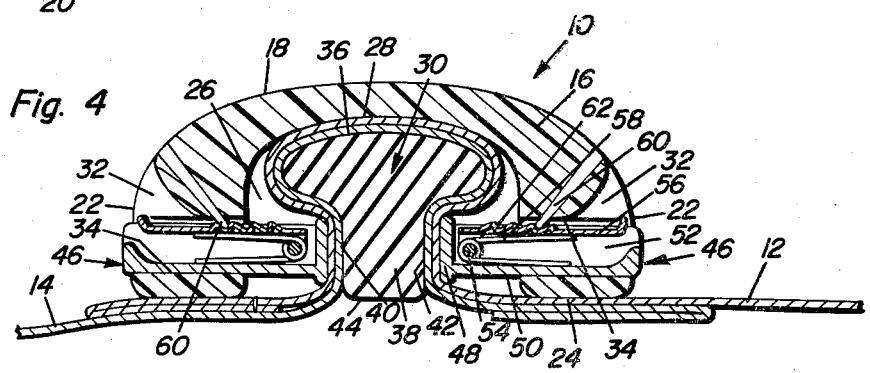
FIGURE 4 is a sectional view taken through a plane indicated by section line 4—4 in FIGURE 1.

Referring to FIGURE 4 in particular, it will be observed that the fastener device 10 includes a casing member 16 which may be made of some form of rigid plastic, it being essential that this casing part of the fastener device 10 is of relatively rigid material. The casing member 16 is of generally arch shaped configuration and includes a top surface 18 which has a smoothly curved shape which may be provided with relief decorations if desired, and presents a neat and pleasant appearance. The casing member 16 also includes end surfaces 20 as more clearly seen in FIGURE 1, and side surfaces 22 which are smoothly continuous with the top surface 18. Referring to FIGURE 2, it will be observed that the bottom surface 24 of the casing member 16 is flat so that the fastener device 10 will rest against the fabric in a smooth fashion as more clearly seen in FIGURE 4. The casing member is internally profiled to form a cavity 26 opening from the bottom surface 24 having an inner arched surface 28 against which the fabric layers 12 and 14 are clamped by means of a core member 30 as more clearly seen in FIGURE 4. It will also be observed that a pair of recesses 32 are formed within the parallel side portions 22 of the casing member 16, said recesses 32 being in communication with apertures 34 opening into the cavity 26 of the casing member 16. The recesses and apertures are provided for purposes as will hereafter become apparent.

As indicated hereinabove, the fabric layers 12 and 14 are clamped within the cavity 26 of the casing member 16 against the inner arched surface 28 thereof by means of the core member 30. The core member 30 accordingly includes an enlarged upper clamp section 36 profiled with respect to surface 28 including a surface portion substantially parallel to a surface 28 so as to clamp the fabric layers therebetween without damage to the fabric. The core member 30 also includes a shank section 38 which has parallel clamping sides 40 and 42 which are enlarged at end portions 43 as more clearly seen in FIGURE 2 to prevent endwise disassembly. Also the bottom 44 of the shank portion 38 of the core member 30 when inserted into the casing member 16 for clamping of the fabric will be substantially flush with the bottom surfaces 24 of the casing member so as to avoid any discomfort to the person.

In order to clamp the fabric layers 12 and 14 against the sides 40 and 42 of the shank portion of the core member 30 in order to prevent displacement between the core member and the casing member 16, a pair of clamping assemblies generally indicated by reference numeral 46 are provided. The clamping assemblies 46 are slidably inserted into each side portion 22 of the casing member 16 and both are identical in construction. As seen in FIGURE 4, each clamping assembly 46 includes an inner clamping end 48 which is attached to a slide portion 50, the clamping end portion 48 extending beyond the slide portion 50 as more clearly seen in FIGURE 2 so as to prevent disassembly of the clamping assembly 46 from the casing member 16. The slide portion 50 is slidably disposed within the bore of aperture 34 so that it may be slidably moved into adjusted position for accommodating fabric layers of different thicknesses.

Therefore, in order to adjustably position the clamping assembly 46 within the aperture 34, a locking mechanism is provided for the purpose. Accordingly, a recess 52 is formed within the slide portion 50 of the assembly 46 for mounting part of the locking mechanism. A pivot pin 54 is positioned within the recess 52 transversely between the sides thereof and adjacent the inner end of the slide portion 50 in order to pivotally mount a latch lever 56. A coil spring member 58 is mounted upon the pivot pin 54 and includes spring arms abutting against the bottom of the recess 52 and the underside of the lever 56 so as to bias the lever 56 upwardly into engagement with a projection 60 mounted within the casing member 16 and projecting into the aperture 34. Accordingly ratchet teeth 62 are provided on the lever 56 for cooperation with the projection 60 so as to position the clamping assembly 46 in any desired adjusted position within the aperture 34. It will be observed that the outer ends of the latch levers 56 are exposed within the recesses 32 so that the levers 56 may be manually depressed against the bias of the spring members 58 in order to release the lock mechanism and clamping assembly 46 from its adjusted position in engagement with the projection 60. The clamping assemblies 46 may therefore be pushed inwardly in order to clamp the fabric layers against the inner core member 30 and to also hold the core member clamped within the casing member 16. The lock mechanism therefore prevents withdrawal of the clamping assemblies 46. It will therefore be observed that the fabric layers are clamped with a clamping pressure of appropriate magnitude for the fabric being fastened because of the controllable extent to which the clamping assemblies are pressed up against the fabric sufficient to prevent relative displacement between the casing and core of the device and maintain the relative surface profiling therebetween arranged to resist separating forces that may be applied to the fabric layers. Accordingly, the fabric will not be unnecessarily damaged by too great a clamping pressure and also because of the smoothly curved clamping surfaces will also avoid damage to the fabric. In connection with the above, the inner core member 30 is preferably made of a relatively resilient material as compared with the more firm material of which the casing member 16 is made. The inner core member 30 may therefore be made of some form of hard rubber which constitutes a friction material as is well known by those skilled in the art.

Figure 5:
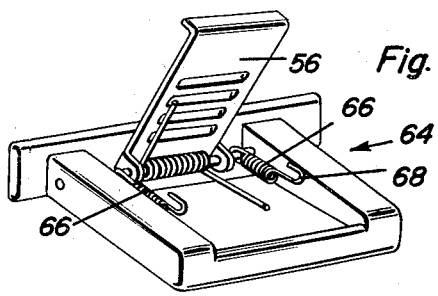
FIGURE 5 is a perspective view of a modification of the clamp device used in the fastener device of FIGURES 1–4.

Referring now to FIGURES 5 and 6 a modified form of clamping assembly 64 replaces the clamping assembly 46 used in the fastener device 10 illustrated in FIGURES 1-4. The clamping assemblies 64 are similar in construction to the clamping assemblies 46 but in addition thereto include a pair of spring elements 66 on either side of the latch lever 56. The spring elements 66 are connected to the pivot pin for the latch lever at one end of the spring elements 66 while the other end 68 of each spring element is engageable within a recess 70 in the casing member 16 so as to bias the clamping assemblies 64 outwardly with respect to the casing member 16 upon release of the locking mechanism. Accordingly, the spring elements 66 are operative to positively release the clamping assemblies from engagement with the fabric when the latch lever 56 is depressed for release of the lock mechanism which may be of considerable convenience to the user of the fastener device.

In FIGURES 7-10 a second form of fastener device is utilized for fastening together the overlapping fabrics 12 and 14. The fastener device generally indicated by reference numeral 72 is similar in function and construction to the fastener device 10 except for the construction details of the clamping assemblies and the cooperative structure on the casing member. Accordingly, the casing member 74 includes recesses 76 serving a similar purpose as the recesses 32 in the fastener device 10 previously described. Also slidably disposed within the casing member 74 are a pair of clamping assemblies 78 serving similar purposes as the clamping assemblies 46 of the clamping device 10. The clamping assemblies 78 include a slide member 80 which mounts at its inner end a spring lever element 82 normally in an upward position and capable of being resiliently displaced downwardly. As more clearly seen in FIGURE 10, the lever element 82 includes stepped shoulder sides 84. The shouldered sides 84 are therefore engageable with the stepped shoulder surfaces 86 formed within an opening 88 within which the clamping assemblies 78 are slidable, said opening 88 being in communication with the cavity within the casing member 74 and in communication with the recesses 76. It will therefore be appreciated that the stepped shoulder sides 84 of the lever element 82 may cooperate with the different step portions of the surfaces 86 so as to adjustably lock the clamping assemblies 78 at any adjusted position thereof.

In FIGURE 11 an alternative form of clamping assembly 90 is illustrated and may replace the clamping assemblies 78 as used in the clamping device 72 illustrated in FIGURES 7-10. The modified clamping assembly 90 differs from clamping assembly 78 in that a more rigid lever element 92 is provided and is spring biased upwardly by means of a spring element 94 in a fashion similar to the spring element 58 as described with respect to the fastener device 10 illustrated in FIGURES 1-4. Accordingly the clamping assembly 90 also includes a recess portion 96 within which the spring element 94 and pivot for the lever element 92 is seated.

From the foregoing description, operation and utility of the clamping devices made in accordance with this invention will be apparent. It will therefore be recognized that the fastener device made in accordance with this invention enables the connecting of layers of fabric with any desired or requisite holding force and without incurring any damage to the fabric or discomfort to the person when the fabric so fastened is applied to the person's skin.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fastener for holding fabric together comprising, rigid internally profiled casing means, inner core means completely insertable within said casing means and externally profiled for clamping layers of fabric thereagainst within the casing means in response to non-displaceable positioning of the core means within the casing means, and releasable clamp means slidably disposed within said casing means to engage fabric layers of varying thickness sufficient to prevent displacement of the core means relative to the casing means, said casing means comprising a casing member having a smoothly curved external surface, a flat bottom surface defining an inner cavity with a profiled inner surface within which said core means is disposed, said core means comprising a relatively resilient core member having an external surface portion profiled relative to said inner surface of said casing member for clamping the fabric therebetween and a shank portion terminating flush with said bottom surface of the casing member and having enlarged end portions to prevent disassembly of the core means from the casing means, said clamp means comprising a pair of slide members slidably disposed within said casing member on opposite sides of said core means for clamping the fabric against said shank portion of the core member to resist displacement of the core member relative to the casing member, each slide member including an inner clamping end and an outer end exposed within a recess formed in the external surface of said casing member, and releasable lock means operatively mounted within said casing member and on each slide member for locking the slide members in core clamping position within said casing member, said lock means including a latch lever mounted adjacent the inner end of each slide member biased into engagement with catch means disposed within said casing member, said latch levers having outer ends exposed within the recesses for releasing the levers from engagement with the catch means.

2. The fastener as defined in claim 1, wherein said catch means comprises a projection cooperating with ratchet teeth formed on said latch levers for locking the slide member in any adjusted position.

3. The fastener as defined in claim 2, including spring means operatively connected between each slide member and the casing member for automatically releasing the slide member from contact with the fabric upon release of the lock means.

4. A fastener for holding fabric together comprising, rigid internally profiled casing means, inner core means completely insertable within said casing means and externally profiled for clamping layers of fabric thereagainst within the casing means in response to non-displaceable positioning of the core means within the casing means, and releasable clamp means slidably disposed within said casing means to engage fabric layers of varying thickness sufficient to prevent displacement of the core means relative to the casing means, said clamp means comprising a pair of slide members slidably disposed within said casing means on opposite sides of said core means for clamping of fabric thereto to prevent displacement of the core means, a latch lever operatively connected to each slide member adjacent an inner end thereof, said lever having stepped shoulder side portions engageable with stepped surfaces formed within said casing means for locking the slide member in any adjusted position.

5. A fastener for holding fabric together comprising, rigid internally profiled casing means, inner core means completely insertable within said casing means and externally profiled for clamping layers of fabric thereagainst within the casing means in response to non-displaceable positioning of the core means within the casing means, and releasable clamp means slidably disposed within said casing means to engage fabric layers of varying thickness sufficient to prevent displacement of the core means relative to the casing means, said clamp means including releasable lock means having a releasing portion exposed within a recess opening externally in the casing means, and spring means operatively connected between the clamp means and the casing means for automatically releasing the clamp means from contact with the fabric in the casing means upon release of the lock means.

References Cited in the file of this patent

UNITED STATES PATENTS

| | | |
|---|---|---|
| 1,424,209 | Pabst | Aug. 1, 1922 |
| 2,121,147 | Goodrich | June 21, 1938 |
| 2,186,789 | Rosenberg | Jan. 9, 1940 |
| 2,227,365 | Prevost | Dec. 31, 1940 |
| 2,532,162 | Goss | Nov. 28, 1950 |

FOREIGN PATENTS

| | | |
|---|---|---|
| 12,206 | Great Britain | of 1913 |